Oct. 4, 1949.  A. L. LAWSON  2,483,914
U-TUBE PRESSURE GAUGE
Filed Sept. 4, 1945
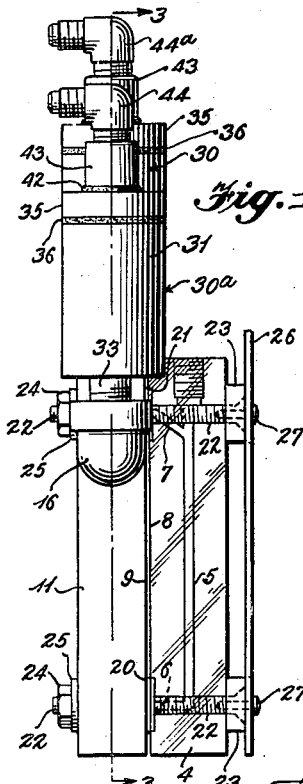
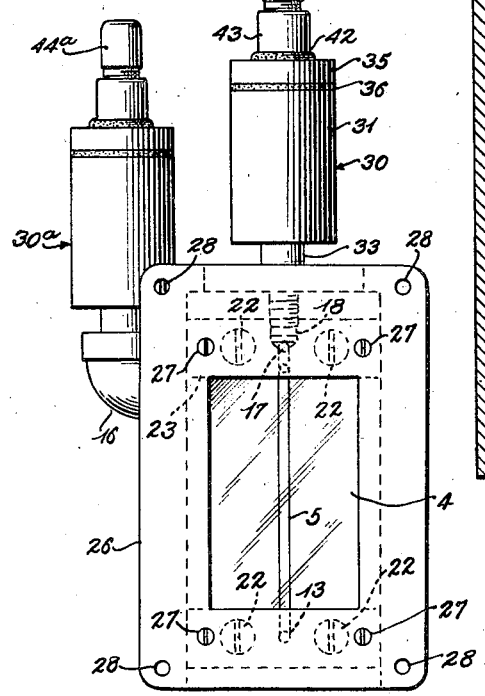
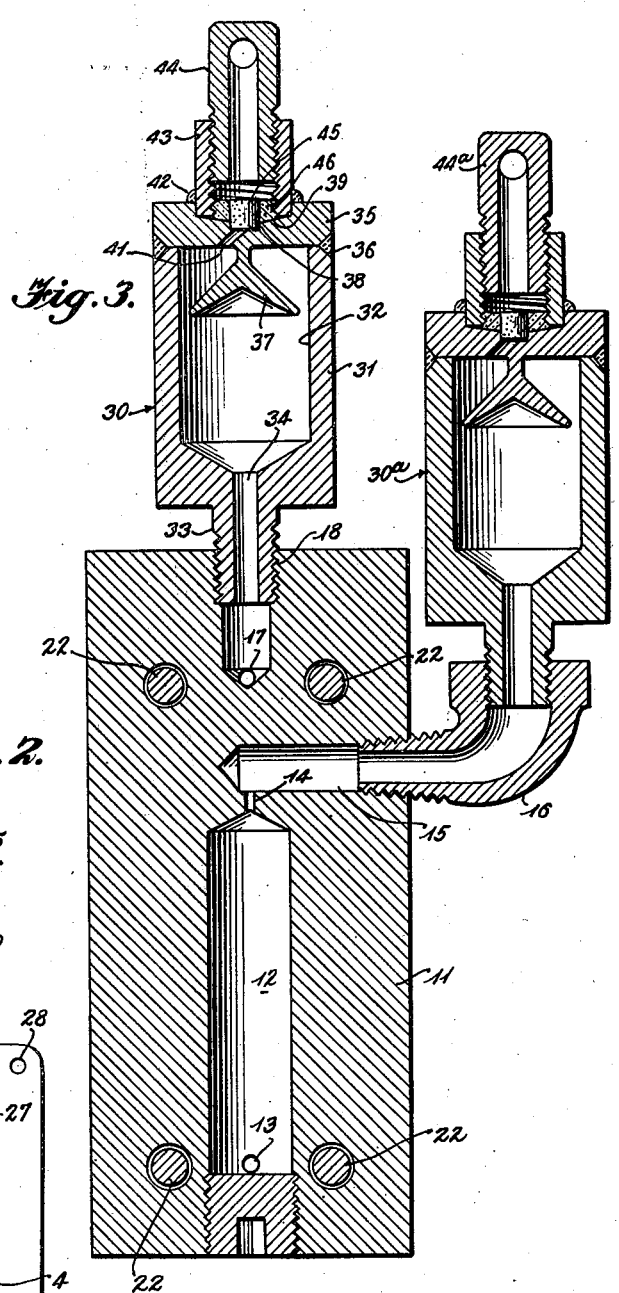
INVENTOR.
*Andrew L. Lawson*
BY
*R. Donald Myno*
ATTORNEY Patented Oct. 4, 1949

2,483,914

UNITED STATES PATENT OFFICE 2,483,914

U-TUBE PRESSURE GAUGE

Andrew L. Lawson, Lincolnshire, Ill., assignor to Cardox Corporation, Chicago, Ill., a corporation of Illinois Application September 4, 1945, Serial No. 614,119

9 Claims. (Cl. 73—401)

This invention relates to U-tube pressure gauges for indicating liquid level, and more particularly, to a splash pot to be associated with such a gauge.

The gauge with which the present invention is concerned is of the character intended to indicate the liquid level within a container or vessel employed for transporting or storing liquids, such as carbon dioxide, that develop high vapor pressure when confined at normal temperatures. A gauge of this character is disclosed in Patent No. 2,361,440 to H. V. Williamson, dated October 31, 1944.

In the use of gauges of the aforementioned character, it has been found that under extraordinary conditions the gauge liquid will be blown from the reservoir or from the sighting tube. In the abovementioned patent, restricted passageways are formed, as shown at 25a and 30, for the purpose of preventing the gauge liquid from being carried over into the supply lines before the pressure surge has ceased. However, because of the high pressure under which carbon dioxide is stored in the system to which the present invention is applied, an accidental leakage or improper manipulation of valves may cause such a pressure surge that the small orifices in the gauge of the patent will not be completely satisfactory.

In accordance with the present invention means are provided to prevent such splashing of the gauge liquid which would tend to carry it over into the supply lines. In this respect, the invention involves as one of its features the provision of a porous block which is pervious to the passage of air or vapor, but which is much less pervious to the passage of the gauge liquid.

A further feature of the invention involves the provision of a guard which prevents splashing of the liquid directly against the porous block.

Other features of the invention will be apparent from the following description when considered in connection with the accompanying drawings.

In the drawings:

Figure 1 is a side elevational view of the gauge showing the splash pots applied thereto;

Figure 2 is a front elevation of Figure 1, and

Figure 3 is an enlarged section on the line 3—3 of Figure 1.

For a complete description of the gauge, Patent 2,361,440 may be referred to. However, a brief description of this article will be given here. This includes a transparent sight block 4 having a vertical passageway 5 therethrough, the lower end of which communicates with a right angular passageway 6, and the upper end of which communicates with a sloping passageway 7. The communicating passageways 6 and 7 open out at a side face 8 of the sight block 4.

The side face 8 is disposed toward a flat face 9 of a metallic base or body block 11. Within the body block 11 is a reservoir 12 to contain the gauge liquid and at the lower portion of the reservoir 12 is an outlet 13 which opens at the face 9 of body block 11 in registry with the opening 6 in the transparent sight block 4. The upper end of the reservoir 12 is in communication through a restricted portion 14 with a port opening 15. This port opening 15 is internally threaded to receive an elbow coupling 16.

An opening 17 within the metallic body block 11 opens at the face 9 of this block in registry with the opening 7 in the transparent sight block 4. Within the body block 11 the opening 17 communicates with a port opening 18 which is internally threaded. Opening 17 preferably should be of small size to restrict flow of fluid therethrough.

Between the meeting faces 8 and 9 of the sight block 4 and body block 11, respectively, and in line with the registering openings are gaskets 20 and 21. To clamp the sight block 4 and metallic body block 11 firmly toward each other, so that the gaskets 20 and 21 will be in gas-tight engagement, bolts 22 are provided. These bolts 22 pass through reinforcing metal bars 23 which bear on the front side of the transparent sight block 4 and nuts 24, and lock washers 25 on the bolts 22 bear upon the rear face of the body block 11.

The heads of clamping bolts 22 are countersunk in the reinforcing bars 23 so that a mounting plate 26 may be held flat against the reinforcing bars 23. Screws 27 passing through the face plate 26 are threaded into the reinforcing bars 23. This mounting plate is utilized to hold the gauge in the desired place as against a panel or against a metal sheathing having an opening therein through which the passageway 5 may be viewed. The gauge is held in such position by bolts passing through openings 28 in the mounting plate 26.

A gauge plate may be carried by the gauge at any desired location where it can be viewed alongside of the liquid in the vertical passageway 5. For example, this gauge plate may be mounted as is the plate 45 in Figure 3 of the aforesaid patent.

Threaded within the port opening 18 is a splash pot 30 of the invention and threaded into the elbow coupling 16 is another splash pot 30a of the invention. As the splash pots 30 and 30a are identical in construction, a description of the one will suffice to explain the construction of both of them and consequently only one will be described in detail.

Considering the splash pot 30, it includes a body 31 having a chamber 32 therein. A stem 33 at the lower part of body 31 is threaded into the port opening 18 and through the stem 33 is a passageway 34 which opens into the chamber 32. Chamber 32 opens out at the upper end of the body 31.

Closing the upper end of the body 31 and thereby sealing the upper end of chamber 32 is an end plate 35. This plate 35 may be affixed to the body 31 in any desired manner and as here shown this is by welding 36. Supported by the plate 35 within the chamber 32 is a splash shield 37 of inverted funnel shape. This splash shield thereby provides a recessed under face which directly overlies the opening 34 so that any gauge liquid which is forced upwardly from the opening 34 will be turned back downwardly by the recessed under face of the shield 37. Any of the gauge liquid which falls upon the upper surface of splash shield 37 will run downwardly along its sloping surface and fall into the lower end of chamber 32. The bottom wall of chamber 32 slopes toward the passageway 34 to make sure this gauge liquid is returned to passageway 5.

Within the outer face of end plate 35 is a socket 38 and a counterbored recess 39 of larger diameter. A port opening 41 extends through the plate 35 into the lower end of the socket 38 and it will be observed that the opening 41 is inclined so that it is not obstructed by the stem support for the shield 37.

Secured within the counterbored recess 39, as by welding 42, is an internally threaded sleeve coupling 43. A coupling 44 is threaded into the sleeve 43 and this coupling 44 provides an attachment for the conduit 18 in Patent 2,361,440. A similar coupling 44a affixed to the splash pot 30a provides an attachment for the conduit 11 of Patent 2,361,440.

Within the socket 38 is a block of porous material 45. This material is preferably of the same external size as the socket 38 so that it fits therein. To further hold the porous block 45 in this place and prevent escape of gas therearound, attachment material 46 is provided. This material 46 may be of any desired character, but it has been found that plaster of Paris is suitable.

As an important feature of the invention, the porous block 45 is of a material which will permit the passage of gas or air therethrough, but will not permit as free a passage of the gauge liquid. The porous block functions to provide a large number of extremely minute, tortuous passageways of irregular cross-section, so that it acts as a snubber to prevent surging within the gauge. A suitable material which is pervious to air and gas, but which is much less pervious to mercury when used as the gauge liquid, is grade #84 Norton alundum which is 36.9% porous and retains particle sizes of .1 micron.

In use, if a sudden pressure surge occurs, the gauge liquid will be driven upwardly through the opening 34 in the splash pot and will be initially directed downwardly by the shield 37. However, any droplets of this liquid which enter the opening 41 and reach the porous block will be arrested by the porous block. A similar function occurs if upon a reverse pressure surge gauge liquid is carried into the splash pot 30a. It has been found that the presence of the porous block 45 in the system in no way affects the accuracy of the gauge. This porous block may require a short time for pressure conditions to come to equilibrium when the gauge is initially brought into communication with the storage vessel, but this time lag will be only on the order of one minute.

What I claim is:

1. A splash pot comprising a body having a chamber therein, attachment means at the lower end of the body through which a passageway opens into the lower part of the chamber, attachment means at the upper end of the body through which a passageway opens into the upper part of said chamber, said upper passageway having an enlarged outer portion, and a porous block seated in said enlarged portion and sealed therein, said porous block being pervious to gas but much less pervious to gauge liquid.

2. In a U-tube pressure gauge, a transparent body having a passageway therethrough, a reservoir having its lower end in communication with the lower end of said passageway, a body of gauge liquid in said reservoir and passageway, separate splash chambers connected to the upper ends of said passageway and said reservoir with each of said splash chambers having a restricted opening at its upper end, a coupling communicating with each restricted opening and adapted to be subjected to a surge of high pressure fluid from an external source, and a block formed of porous material bridging each restricted opening outwardly of the latter, the material of said blocks being of such a porous character as to snub the passage of a surge of high pressure fluid into the splash chambers and to substantially prevent the passage of gauge liquid out of the splash chambers.

3. A U-tube pressure gauge of the type defined in claim 2, further characterized by the provision of a shield in each splash chamber for protecting the associated porous block from splashed gauge liquid.

4. A splash pot for preventing the development of a high pressure fluid surge in a U-tube pressure gauge employing gauge liquid and for preventing the loss of liquid from the gauge, comprising a body having a splash chamber therein, means for connecting the lower end of said body to one arm of a U-tube pressure gauge, a closure plate for the upper end of said body, a recess of relatively large diameter formed in the outer face of said closure plate, a sleeve seated at one end in said recess and fastened to the closure plate, a shallow socket formed in the bottom wall of said recess and having a restricted port passing through the remainder of the thickness of said closure plate, a porous block seated in said socket and projecting into the bore of said sleeve, and a seal of plastic material molded in the space between the periphery of the porous block and the surrounding surface of the sleeve bore, whereby the inner end face of the porous block is exposed only through the said restricted port and the entire outer end face of the porous block is exposed in the bore of said sleeve, and a coupling for connecting the sleeve to a source of high pressure fluid.

5. A splash pot of the type defined in claim 4, further characterized by the provision of a shield in the splash chamber of said body for protecting the exposed portion of the inner end face of the porous block from splashed gauge liquid.

6. A splash pot for preventing the development of a high pressure fluid surge in a U-tube pressure gauge employing gauge liquid and for preventing the loss of liquid from the gauge, comprising a body having a chamber therein, means for connecting the lower end of said body to a U-tube pressure gauge, means forming a passageway into said chamber through the upper end of said body, said passageway having a restricted portion adjacent said chamber, a porous block seated in said passageway adjacent said restricted portion, sealing means between the periphery of said porous block and the surrounding surface of said passageway, whereby the entire outer end face of said porous block is exposed in said passageway and the inner end face is exposed only through said restricted portion, and means for connecting said passageway to a source of high pressure fluid.

7. A splash pot of the type defined in claim 6, further characterized by the provision of a shield in the chamber of said body for protecting the exposed portion of the inner end face of the porous block from splashed gauge liquid.

8. In a U-tube pressure gauge, a transparent body having a passageway therethrough, a reservoir having its lower end in communication with the lower end of said passageway, a body of gauge liquid in said reservoir and passageway, separate splash chambers connected to the upper ends of said passageway and said reservoir with each of said splash chambers having a restricted opening at its upper end, a coupling mounted on the upper end of each of said splash chambers, said couplings each having a passageway therethrough of relatively large dimensions in alinement with the restricted opening of the associated splash chamber, and a block of incompressible porous material, larger than said restricted openings, mounted in the passageway of each coupling adjacent the restricted opening, whereby the inner face of said porous block is exposed only through said restricted opening and the entire outer end face of the porous block is exposed in the passageway of said coupling.

9. In a U-tube pressure gauge, a transparent body having a passageway therethrough, a reservoir having its lower end in communication with the lower end of said passageway, a body of gauge liquid in said reservoir and passageway, separate splash chambers connected to the upper ends of said passageway and said reservoir with each of said splash chambers having a restricted opening at its upper end and an outer socket larger than and in alinement with said restricted opening, a block of incompressible porous material positioned in each of said sockets, a sleeve mounted on each of said splash chambers to provide a passageway outwardly of said porous block, and a shield mounted in each of said splash chambers below the restricted openings to substantially prevent gauge liquid from splashing into the restricted openings to contact said porous blocks.

ANDREW L. LAWSON.

REFERENCES CITED

The following references are of record in the file of this patent:

UNITED STATES PATENTS

| Number | Name | Date |
|---|---|---|
| 903,973 | Heiland | Nov. 17, 1908 |
| 1,586,201 | Kauffmann | May 25, 1926 |
| 1,598,571 | Fox | Aug. 31, 1926 |
| 1,642,615 | Lommel | Sept. 13, 1927 |
| 1,858,399 | Jones | May 17, 1932 |
| 2,118,229 | Reynolds | May 24, 1938 |
| 2,361,440 | Williamson | Oct. 31, 1944 |
| 2,411,508 | Dwyer | Nov. 26, 1946 |

FOREIGN PATENTS

| Number | Country | Date |
|---|---|---|
| 99,976 | Switzerland | July 2, 1923 |
| 523,988 | France | May 6, 1921 |